(No Model.)
W. R. PATTERSON.
JOINT FOR LEAD PIPES.
No. 300,005. Patented June 10, 1884.
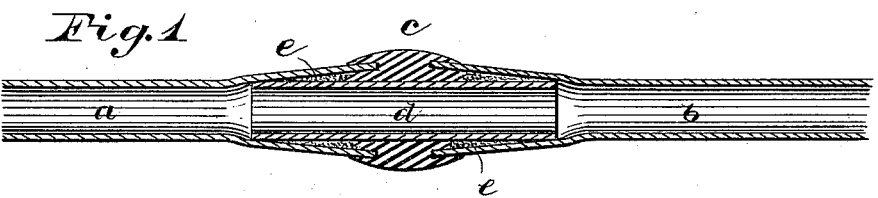
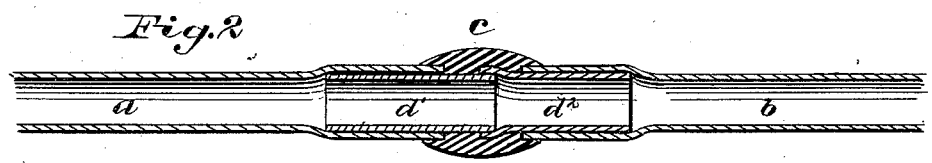
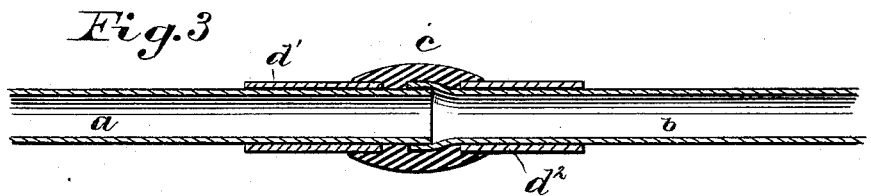
Attest
Paul A. Staley
Daul H. Patrick
Inventor
William R. Patterson
By
George P. Barton
Attorney

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

JOINT FOR LEAD PIPES.

SPECIFICATION forming part of Letters Patent No. 300,005, dated June 10, 1884.

Application filed February 20, 1883. (No model.)

*To all whom it may concern:*

Be it known that I, WILLIAM R. PATTERSON, a citizen of the United States, residing at Chicago, in the county of Cook and State of Illinois, have invented a certain new and useful Improvement in Joints for Lead Pipe, of which the following is a full, clear, concise, and exact description, reference being had to the accompanying drawings, forming a part of this specification.

In uniting lengths of lead pipe by the ordinary wiped joints a small portion of the lead of the pipe is first scraped away to clean the surface, so the solder will adhere thereto. The metal thus scraped away is sufficient to be appreciable in thin pipes. The solder is then applied to the joint and unites with the lead to a slight depth. This hardens the pipe and makes it brittle. The solder is usually applied in sufficient body to render the pipe sufficiently strong at the immediate joint; but at a point on either side of the joint, near where the solder terminates, the pipe is materially weakened, for the reasons above set forth, and frequently breaks off. When the pipe is armored, as in the case of telegraph-cable pipes, for which this invention is especially adapted, the tendency to break at this point is increased.

My invention consists in providing a sleeve or strengthening-piece of lead at the joint and uniting the same with the sections of lead pipe by means of a wipe-joint. The pipe is thus strengthened near each joint by an extra thickness of lead.

In splicing telegraph-cables, for which my invention is especially useful, it would be impracticable to solder the joint on the inside by heat applied to the outside thereof since the insulating material, being melted, would run out and prevent the solder from uniting with the lead.

In making the wipe-joint I apply the melted solder to the surfaces to be joined until the paraffine or other insulating substance, if any adheres to the surfaces, is burned off, when the solder will unite with the said surfaces and form a perfect joint.

My invention is limited to wipe-joints of flexible lead pipes, and could not be applied to cast-iron or sheet-iron pipes.

In the accompanying drawings several ways of carrying out my invention are shown respectively by Figures 1, 2, and 3, each of said figures being a longitudinal sectional view of a lead pipe at the joint.

In each of the said views, $a$ and $b$ represent, respectively, the lengths of the main pipe to be joined, the internal diameter of which is uniformly maintained through the joint.

In making the joint as shown in Fig. 1 the ends of the pipe $a$ $b$ are expanded and enlarged sufficiently to admit a short piece of soft-lead pipe $d$, which has the same internal diameter as the main pipe $a$ $b$. The ends of the pipe $a$ $b$ are then brought over the short piece $d$ and the solder $c$ wiped around the same, as shown, joining the whole firmly together. The piece $d$ extends beyond the points where the solder terminates on each side of the joint, and thus strengthens the pipe at these points.

In Fig. 2 two pieces of pipe, $d'$ $d^2$, are used inside the main pipe $a$ $b$, instead of a single piece, $d$, as in Fig. 1, the solder $c$ uniting the whole in a similar manner. In Fig. 3 the pieces $d'$ $d^2$ are shown placed on the outside of the main pipe $a$ $b$, the ends of the said main pipe being joined in the ordinary manner and the whole firmly united, as before, by the solder $c$.

As shown at $e$, Fig. 1, the space between the interior of the pipe $a$ $b$ at the ends and the exterior of piece $d$ is preferably partially filled with cotton, hemp, or other suitable material before the solder $c$ is applied, as this space could not be easily filled with the solder.

I claim as my invention—

1. The combination, substantially as hereinbefore set forth, with the sections of pipe, of a strengthening of lead, forming with the ends of the sections on each side the wipe-joint a double thickness of metal, the whole being firmly united by the solder which joins the two ends of the sections of pipe, substantially as and for the purpose specified.

2. The combination, with the wipe-joint of the lead pipe of a telegraph-cable, of the strengthening-piece $d$, extending beyond the solder on both sides the joint, said solder being united to said strengthening-piece and to the ends of the sections, substantially as and for the purpose specified.

In witness whereof I hereunto subscribe my name this 14th day of February, A. D. 1883.

WILLIAM R. PATTERSON.

Witnesses:
PAUL A. STALEY,
GEORGE P. BARTON.